July 6, 1943.  H. H. COLSON  2,323,647
GAUGE POSITIONING MECHANISM
Filed Nov. 12, 1941   2 Sheets-Sheet 1
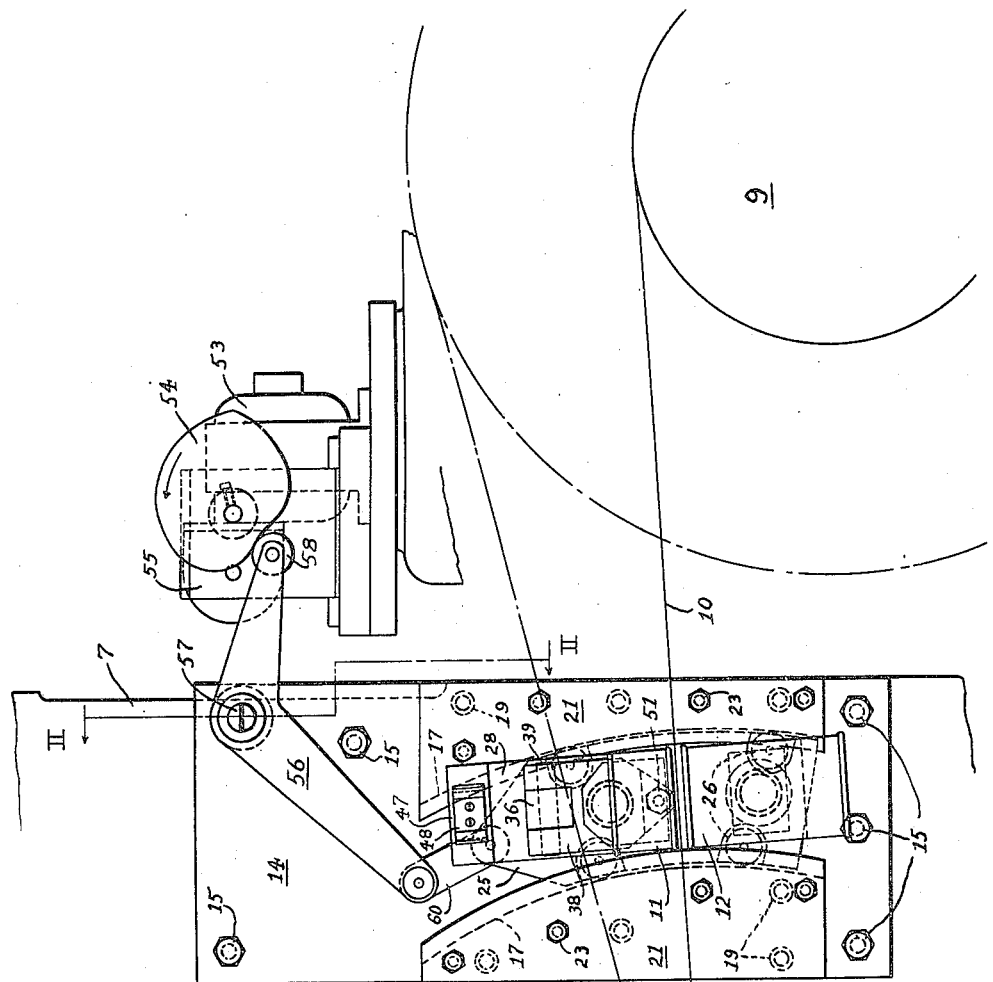
Fig. 1.
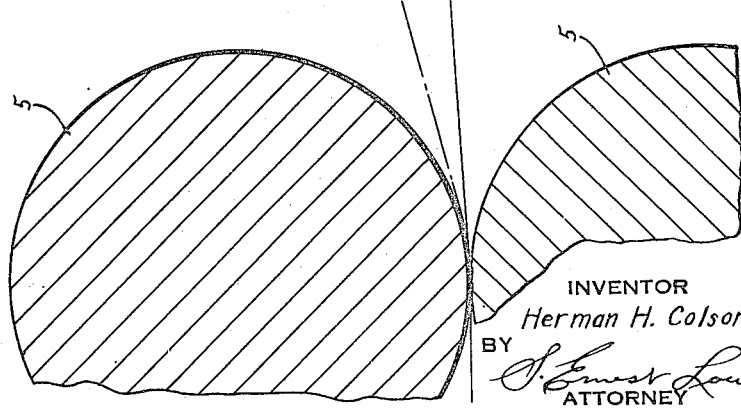
INVENTOR
Herman H. Colson
BY
ATTORNEY

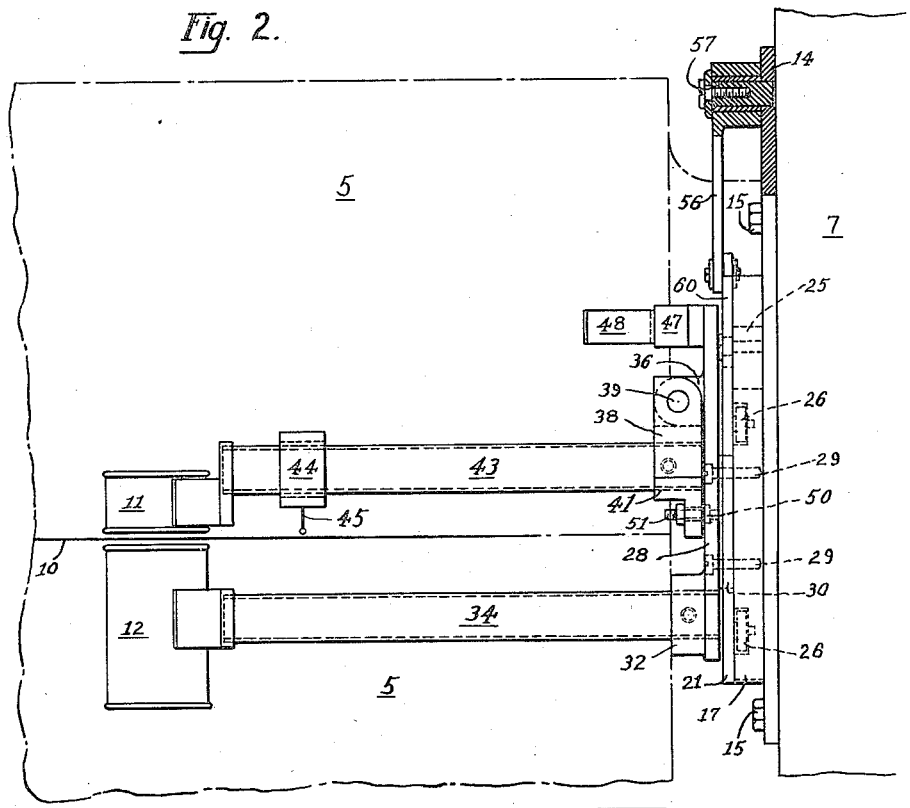
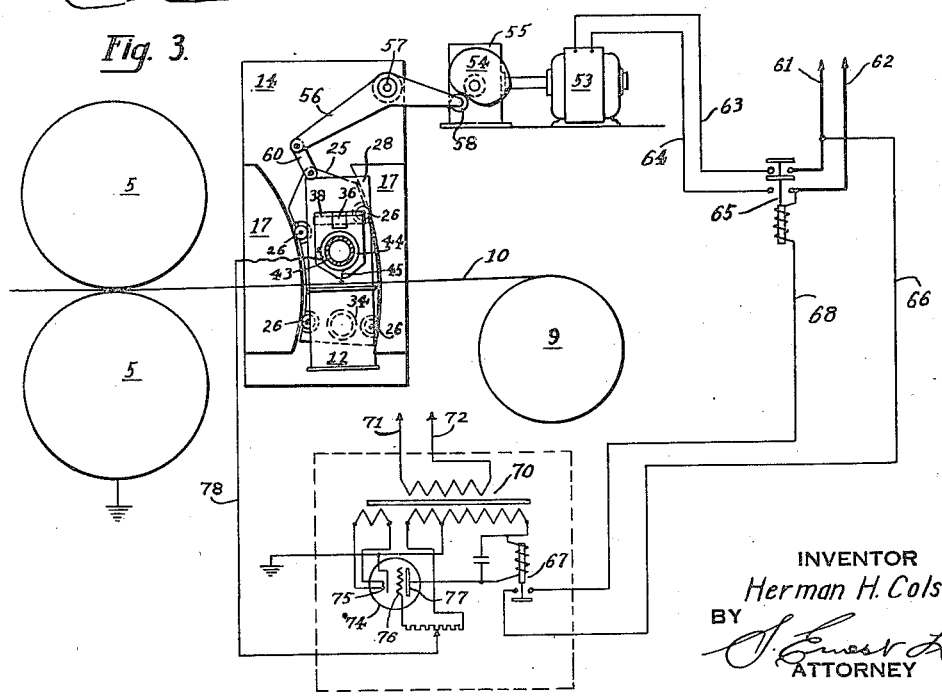

Patented July 6, 1943

2,323,647

UNITED STATES PATENT OFFICE 2,323,647

GAUGE POSITIONING MECHANISM

Herman H. Colson, Teaneck, N. J., assignor to Aluminum Company of America, Pittsburgh, Pa., a corporation of Pennsylvania Application November 12, 1941, Serial No. 418,866

6 Claims. (Cl. 33—147)

This invention relates to an instrument or indicator positioning mechanism for use with strip processing apparatus. It pertains, by way of example, to a gauge positioning mechanism adapted for use with a floating gauge for material spanning a strip mill and reel, particularly a foil mill and rewinding reel for the same.

The invention will be described with reference to a particular application of the same to a foil rolling mill and rewinding reel employing a non-contacting thickness gauge of the floating type for indicating the gauge of the foil strip as it leaves the mill and before it is rewound on the reel. Particularly with foil materials, the gauge should not touch the foil strip. With this limitation, it has been necessary in the past to maintain the foil strip at a constant level between the mill and an idling roller disposed in front of the reel, in order that the gauge may be disposed about the foil strip between the mill and the idling roller without interference with the foil strip. In this prior practice, the foil strip, after passing the idling roller, is free to follow the build-up or run-down of material in coiled form on the reel and to change its inclination beyond the idling roller without interference from the gauge. However, with many materials, particularly with foil material, it is undesirable to use an idling roller between the mill and the rewind reel. The idling roller often accentuates or causes wrinkling of foil strip. Other objections to the idling roller may appear with other strip forms. Without the idling roller, there has been heretofore no way of employing a floating gauge on strip, continuously or semi-continuously during a processing operation, unless the gauge be of the contacting type mounted so that it might freely follow the change in inclination of the strip between the mill and the reel. With foil materials the strip strength is not usually such that this latter practice can be employed. Even with other materials it is desirable to avoid unnecessary touching of the strip, so as to minimize scratching and marking.

The invention contemplates the provision of means for supporting a gauge in spaced adjacent relationship to the span of strip material between the mill and reel, providing means for raising and lowering the gauge to follow the changing level or inclination of the strip, and providing means for sensing the change in inclination of the strip for actuating raising and lowering means in response thereto. Thus, the invention contemplates provision of mechanism for positioning a gauge in continuously adjusted relationship to the strip, maintaining it out of contact with the strip, and thus imposing no load on the strip such as would otherwise be necessary.

Since the invention is applicable to various instruments and indicators and to the indicating and gauging, etc., of various materials in various processing apparatus, the following definitions may be kept in mind in reading the specification. The word "strip" shall be taken to include continuous lengths of materials, whether of metal or not, foil and paper, ribbons, flat wire, wire, cable, thread, yarn, or the like which may be subjected to continuous processing operations. As used herein a "processing apparatus" may be a rolling mill, strip leveler, strip washing or degreasing apparatus, flying shear, trimmer, slitter, or punching apparatus, or a re-reeling or re-spooling apparatus. As used herein in "mandrel-like reel" or a "reel" should be taken to include either a winding or unwinding reel, mandrel, block, spool, drum, or the like. In processing any of the named materials through any of the named apparatus in cooperation with any of the named winding or unwinding devices, there may be changes in the elevation and/or angle of inclination of a span of strip material, which material it is expedient to control during processing by means of an inspection device, indicator, or gauge.

The particular apparatus and mechanism here described comprises a rolling mill for rolling foil material, a rewinding reel for the same, and a control device in the form of a non-contacting electrical thickness gauge. An example of the gauge is that manufactured and sold by the General Electric Company of Schenectady, New York, and identified as a Metal foil thickness gauge for aluminum foil, Model 8DD7AY258, Catolog Nos. 5924999G1 and 5920267G1. A gauge of this type is sensitive to variations in thickness of metal from a given standard, and with a suitable indicating instrument is useful in continuous gauging of strip during processing, as will be well known to those skilled in this art. The sensitivity of the gauge arises by reason of the biasing of an electromagnetic circuit affected by the metal passing between parts of the gauge. The gauge may be connected to an indicating instrument calibrated to show plus or minus variations from a standard gauge, and used for a continuous running check on the gauge of material being processed by a rolling mill.

An object of the invention is the provision of means for continuously gauging strip material between a mill and a reel without the use of an idling roller. A further object is the gauging of strip material continuously changing position without gauging contact therewith.

Another object of the invention is the provision of means for causing a non-contacting gauge to follow the inclination of strip material being processed and reeled without imposing a load thereon.

Another object of the invention is to provide a positioning mechanism for an indicating device used in strip processing which permits the utmost freedom from interference with the normal strip processing and reeling operations, and yet permits of accurate, continuous determinations being made of strip condition. Other objects and advantages of the invention appear in the following detailed description.

In the drawings:

Fig. 1 is a side view of a rolling mill and strip material reel showing the gauge positioning mechanism of the invention therebetween;

Fig. 2 is a view taken along the lines II—II of Fig. 1 representing the gauge positioning mechanism as viewed from the reeling position; and Fig. 3 is a schematic illustration of the apparatus shown in Figs. 1 and 2 in conjunction with a wiring diagram.

By way of general description, the apparatus shown in Figs. 1 and 2 comprises a rolling mill having rolls 5 supported in housings, one of which is shown at 7, and a rewind reel 9 for the strip material processed by the mill. Disposed above and below the span of strip 10 issuing from the mill and being wound upon the reel 9 are upper and lower parts of the gauge, the upper gauge unit being identified by the reference numeral 11, and the lower gauge unit by the reference numeral 12.

In the operation of the mill and reel, the span of strip 10 issuing from the mill gradually changes its inclination from the approximately horizontal position (shown in full line) as the diameter of the coil of the material on the reel 9 builds up. In Fig. 1, for example, there is shown an upper position of the span 10 in dotted lines as it reaches to a coil of large diameter on the reel 9. Noting that the span of strip 10 moves between extreme positions represented by the heavy line, to which the reference numeral 10 is directed, and the dotted line thereabove, it will be readily apparent that a gauge comprised of upper and lower gauge units 11 and 12 must be caused to follow the span 10 in its movement. For this purpose, a slide support for the gauge and a motor for operating the same through a suitable linkage are provided, along with the necessary control instrumentalities. A detailed description will now be given.

A mounting plate 14 for the gauge positioning apparatus is secured to the inner face of the housing 7 by means of suitable cap screws 15. Guiding means for a slide carrying the upper and lower gauge units 11 and 12 are provided on the mounting plate 14; they comprise guides 17 secured to the mounting plate 14 by suitable cap screws 19, and guide plates 21 secured through the guides 17 to the mounting plate 14 by suitable cap screws 23. The guide plates 21 are superimposed on the guides 17 and overlap the same, thus forming a recessed way or T-slot for a slide which can form therein a tongue and groove fitting. The guides 17 and guide plates 21 are formed with parallel curved opposing edges, these edges lying in arcs of concentric circles drawn with the line of contact of the rolls 5 as an axis. A slide 25 is disposed in the way or T-slot described in roller contact with the edges of the guides through a plurality of side aligning rollers 26. The slide is arcuately formed in manner similar to the guide plates and guides so as to be freely movable upwardly and downwardly therein. The rollers 26 are provided at the edges of the slide 25 to center the slide and facilitate its movement in the way or T-slot.

A gauge bracket 28 is secured to the slide 25 by means of a plurality of cap screws 29 passing through not only the bracket itself but also a filler block 30 and into the slide 25. The gauge bracket is a simple casting having at its lower end a socket 32 adapted to receive a lower gauge arm 34 in the opposite extremity of which is mounted the lower gauge unit 12. The gauge bracket is also provided near its upper end with a suitable eye 36 to which an upper gauge arm hinge 38 is secured by means of a hinge pin 39. The upper gauge arm hinge 38 is a simple casting provided with a socket 41 for an upper gauge arm 43 carrying at its opposite extremity the upper gauge unit 11. Near the upper gauge unit 11 a collar 44 is mounted on the upper gauge arm 43 in insulated relation thereto and provided with a "cat whisker" or "feeler" 45 employed in a manner and for a purpose to be later described.

Returning briefly to the gauge bracket 28, it will be noted that it is further provided with a spring bracket 47 at its upper extremity carrying a spring catch 48 in which the upper gauge arm 43 may be latched when raised from the strip 10 and hinged on the pin 39. In about the center of the gauge bracket 28, a hardened steel insert 50 is provided against which an adjustable stop screw 51 can seat itself, the stop screw 51 being threadedly inserted in the upper gauge arm hinge 38 and secured by a suitable lock nut. The elevation of the upper gauge unit 11 is thus controllable by adjustment of the stop screw 51, and likewise the proper spacing of the upper gauge unit 11 from the lower gauge unit 12 can thereby be obtained. The upper gauge arm is made retractable by the rotation thereof on the hinge pin 39 in order to make threading of the strip 10 from the rolls 5 to the reel 9 less troublesome than would be the case if the gauge units were both permanently mounted. The spring catch 48 is provided as a simple means of holding the upper gauge arm 43 in raised position during the threading operation.

For moving the slide 25 upwardly and downwardly in its guided path, a motor, cam, and linkage system is provided. The motor 53 drives the cam 54 through suitable reduction mechanism 55, a suitable base and foundation for these instrumentalities being provided adjacent housing 7. A bell crank 56 is mounted on a pin 57 secured in the mounting plate 14. The bell crank carries a follower 58 at the end of one arm for contact with the cam 54, and is suitably pinned at the extremity of the other arm to a link 60, which in turn is pinned at its opposite end to the slide 25. It will be readily apparent, then, that operation of motor 53 will turn cam 54 in the direction of the arrow shown on Fig. 1, for instance, thus raising slide 25 through the clockwise rotation of bell crank 56 until the peak of cam 54 passes the follower 58, whereupon the weight of the slide 25 will move the bell crank (with continued cam movement) in a counterclockwise direction of rotation as the follower drops into the receding portion of the cam surface.

Since the function of the gauge made up of the upper and lower units 11 and 12 is to continuously register the thickness or gauge of the strip 10, suitable means for relating the movement of the slide 25 to the movement of the strip 10 are provided. This means is represented by the schematic drawing and wiring diagram of Fig. 3. Before discussing this means and Fig. 3, it may be noted that the indicating dial or gauge instrument for use with the apparatus comprising the units 11 and 12 is not shown in the drawings of this application since its construction and use forms no part of this invention and will be readily found in prior art.

The motor 53 is adapted to be energized by power from the main power lines 61 and 62 which are connected to the motor 53 by main leads 63 and 64 through a double-contactor relay 65. The relay 65 is closed when its solenoid is actuated by energization of its coil in a circuit comprised of main power line 61, control lead 66, control relay 67, control lead 68, the coil of relay 65, and main power line 62.

Control relay 67 is caused to connect or disconnect the circuit to relay 65 in response to the touching of the feeler 45 by the strip 10 as the strip changes in inclination or level during strip rolling. The manner in which this operation is brought about may be described with reference to the electronic switching mechanism shown within the dotted square at the bottom of Fig. 3. The electronic switching mechanism comprises a transformer 70, energized through main leads 71 and 72, a suitable grid bias control tube 74 having a hot cathode filament 75, control grid 76, and anode plate 77, all associated, in a manner readily understandable by those skilled in the art, with a low voltage D. C. control relay heretofore mentioned and identified by the reference numeral 67. The electronic switching mechanism is associated with the gauge, comprising upper and lower units 11 and 12, through a control circuit established by control lead 78 from the feeler 45 to the control grid of the electronic tube 74. Since the strip 10 is grounded through the mill rolls 5 and their housing, and since an appropriate portion of the electronic switching mechanism is suitably grounded, a complete low voltage, low current control circuit is formed with control lead 78 and feeler 45. The feeler 45, adapted to be contacted by the strip 10 and then separated therefrom, forms a control switch in association with the electronic switching mechanism. A detailed description of the electronic switching mechanism will not be entered upon since its construction and operation will be readily apparent to those skilled in this art, particularly after reading the following description of its operation.

In the use of the apparatus above described, the strip 10 is suitably started on the reel 9 and the upper and lower gauge units 11 and 12 disposed properly about the strip 10, as shown in Fig. 1. The rolling process is then begun, and strip winds upon the reel 9. As the strip builds up on the reel 9, it touches the feeler 45. When the strip touches the feeler 45, a circuit is established through the ground connections and control lead 78 to the electronic switching mechanism. The electronic switching mechanism thereupon energizes the control relay 67 which closes its bridging contactor across the control leads 66 and 68, thus energizing the relay 65. When the relay 65 is energized, its bridging contactors close the circuits from the power supply through power lines 61 and 62 and main leads 63 and 64 to the motor 53. Thus, when the strip touches the feeler 45, the motor 53 is caused to operate. The motor 53 turns the cam 54 and raises the slide 25, thereby raising the upper and lower gauge units 11 and 12 to a new position of adjusted relationship to the strip 10. At the same time, the feeler 45, since it is mounted on the upper gauge arm 43, is raised with the upper and lower gauge units 11 and 12 until it is out of contact with the strip 10. When the circuit through the feeler 45 and the strip 10 is broken the electronic switching mechanism de-energizes the coil of the control relay 67, allowing its contactor to drop out and open the circuit to the relay 65. When the coil of relay 65 is de-energized, its bridging contactors drop out and stop the motor 53.

The recurrent making and breaking of circuit to the electronic switching mechanism, as the strip 10 rises, causes the upper and lower gauge units 11 and 12 to follow the strip in recurrent small steps, and the gauge units are maintained in adjusted spaced relationship to the strip 10 throughout the rolling process. When a coil has been completed, the gauge units 11 and 12 may then be lowered to permit the cycle of operations to be started again with a new strip by manual operation of the motor 53 to turn the cam 54 through its receding portion of travel in the same direction of rotation, permitting bell crank 56 to rotate in a counterclockwise direction and lower the slide 25. The manual instrumentalities for controlling the motor 53 are not shown, but their form and use should appear obvious from the foregoing.

While the invention has been described in connection with a foil rolling mill and rewind reel, and applied particularly to a thickness gauge for foil material, it will be apparent that the apparatus could be applied to the unwinding of a coil from a reel to a mill, and to the positioning of instruments of various types other than thickness gauging instruments. The invention is susceptible of numerous modifications and variations coming within the scope of the appended claims, and the claims are to be read in connection with the specification as an exemplification of the invention.

What is claimed is:

1. A positioning mechanism for a device for indicating a condition of strip material, comprising a means for movably supporting said indicating device adjacent said strip material, means for sensing shifting of said material, and means actuated by said sensing means for moving said indicating device, whereby said indicating device is maintained in a predetermined relationship to said strip material.

2. A positioning mechanism for a device for indicating a condition of strip material comprising a means for movably supporting said indicating device adjacent a span of strip material between a processing machine and a reel, means for sensing changing inclination of said span during processing, means actuated intermittently by said sensing means for moving said indicating device whereby the latter is maintained in a predetermined relationship to said strip material.

3. A positioning mechanism for a strip material gauge comprising means for movably supporting said gauge adjacent a span of strip material between a processing machine and a reel, means for sensing variation in inclination of said span during processing, means actuated intermittently by said sensing means for moving said gauge co-extensively with said variation whereby said indicating device is maintained in predetermined relationship to said strip material.

4. A positioning mechanism for a floating gauge comprising means for movably supporting said gauge adjacent a span of strip material between a processing machine and a reel, means for sensing variation in inclination of said span during processing, means actuated intermittently by said sensing means for moving said gauge in step with said variation in inclination of said strip whereby said gauge and sensing means are maintained in a predetermined spaced relationship to said strip.

5. A positioning mechanism for a floating gauge comprising means for supporting parts of said gauge in opposite spaced relationship to strip material between a processing mill and a reel, means for raising and lowering said supporting means, a feeler mounted on said supporting means for sensing the variation in inclination of said strip during processing, said feeler being adapted to complete an electric circuit when the strip is in contact with said feeler, and a relay responsive to contact of said strip with said feeler for operating said raising and lowering means to move said supporting means and gauge in the direction of the variation in inclination of said strip.

6. A positioning mechanism for a floating gauge for continuous indication of strip thickness, said gauge comprising an upper and lower part adapted to be disposed on opposite sides of a span of strip metal between a rolling mill and reel, comprising arms for supporting said gauge parts, a slide for supporting said arms, means for guiding said slide in an arcuate path having as a center the line of contact of the rolls of the mill, means for moving said slide and gauge supported thereby in a path defined by said guiding means, a feeler mounted on one of said arms, said feeler being responsive to variation in inclination of the span of said strip, means actuated by said feeler for operating said moving means when said strip contacts said feeler whereby said gauge is caused to follow said span of strip and its changing angle without contact between the gauge parts and the strip metal.

HERMAN H. COLSON.